(12) United States Patent
Raychev et al.

(10) Patent No.: US 8,700,328 B1
(45) Date of Patent: Apr. 15, 2014

(54) BETTER DIVERSITY FOR TRANSIT ROUTING

(75) Inventors: Veselin Raychev, Zurich (CH); Lucien Pech, Zurich (CH)

(73) Assignee: Google Inc., Mountain View, CA (US)

( * ) Notice: Subject to any disclaimer, the term of this patent is extended or adjusted under 35 U.S.C. 154(b) by 211 days.

(21) Appl. No.: 13/231,895

(22) Filed: Sep. 13, 2011

(51) Int. Cl.
*G01C 21/34* (2006.01)
(52) U.S. Cl.
USPC ............... 701/533; 701/413; 701/416
(58) Field of Classification Search
USPC ............. 701/23, 410, 413, 416, 420, 533
See application file for complete search history.

(56) References Cited

U.S. PATENT DOCUMENTS

| | | | |
|---|---|---|---|
| 5,276,768 A * | 1/1994 | Bander | 706/62 |
| 8,417,409 B2 * | 4/2013 | Bast et al. | 701/25 |
| 2009/0040931 A1 | 2/2009 | Bast et al. | |
| 2011/0112759 A1 | 5/2011 | Bast et al. | |

OTHER PUBLICATIONS

Bast et al., "Fast Routing in Very Large Public Transportation Networks using Transfer Patterns", Jul. 6, 2010, pp. 1-16.

* cited by examiner

*Primary Examiner* — Gertrude Arthur Jeanglaude
(74) *Attorney, Agent, or Firm* — McDermott Will & Emery LLP (57) ABSTRACT

Configurations are disclosed for providing diversity in transit routes to determine optimal public transit routes for journeys or trips between a source station and a target station. The subject technology performs a forward and backward search of a generated query graph (based on a query between the source and target stations). An arrival label set is determined according to a specified queue order and domination function that takes into account different criteria, such as a duration time and an associated penalty of a label. The arrival label set is then filtered to remove dominated labels. The subject technology then determines one or more optimal paths from the source station to the target station based on the filtered label set.

31 Claims, 5 Drawing Sheets

BETTER DIVERSITY FOR TRANSIT ROUTING

BACKGROUND

Many people have begun using various forms of public transportation such as railway transportation, buses, and/or ferries for their travel needs. Public transit planning systems have been developed in order to provide users with directions to travel between a starting location to a destination location via various forms of public transportation.

SUMMARY

The subject technology provides diversity in transit routes between one or more source stations and one or more target stations. The subject technology generates a query graph represented as a set of nodes. The subject technology searches the query graph to determine an arrival set for one or more nodes of the query graph based on a queue order and a domination function. For one or more nodes of the query graph, the subject technology filters the arrival set of the node to remove dominated labels. The subject technology then determines one or more optimal paths from a source station to a target station based on the filtered sets.

The subject technology further includes a system for providing diversity in transit routes between one or more source stations and one or more target stations. The system includes memory, one or more processors, and one or more modules stored in memory and configured for execution by the one or more processors. The system includes a query graph module configured to generate a query graph represented as a set of nodes. The system further includes a search module configured to search the query graph to determine an arrival label set for one or more nodes of the query graph based on a queue order and a domination function. The system also includes a filter module configured to, for the one or more nodes of the query graph, filter the arrival label set of the one or more nodes to remove dominated labels. Additionally, the system includes a path module configured to determine one or more optimal paths from one of the source stations to one of the target stations based on the filtered label set.

Yet another aspect of the subject technology provides for generating a query graph represented as a set of nodes. The subject technology searches the query graph to determine an arrival label set for one or more nodes of the query graph based on a queue order and a domination function. For the one or more nodes of the query graph, the subject technology determines whether a first label has a greater duration time than a second label. The subject technology determines whether the first label includes at least a same set of lines as the second label. The subject technology then removes the first label if the first label has the greater duration time and includes at least the same set of lines as the second label. Additionally, the subject technology determines one or more optimal paths from one of one or more source stations to one of one or more target stations based on a set of labels remaining in the arrival label set.

It is understood that other configurations of the subject technology will become readily apparent to those skilled in the art from the following detailed description, wherein various configurations of the subject technology are shown and described by way of illustration. As will be realized, the subject technology is capable of other and different configurations and its several details are capable of modification in various other respects, all without departing from the scope of the subject technology. Accordingly, the drawings and detailed description are to be regarded as illustrative in nature and not as restrictive.

BRIEF DESCRIPTION OF THE DRAWINGS

The novel features of the subject technology are set forth in the appended claims. However, for purpose of explanation, several configurations of the subject technology are set forth in the following figures.

DETAILED DESCRIPTION

The detailed description set forth below is intended as a description of various configurations of the subject technology and is not intended to represent the only configurations in which the subject technology may be practiced. The appended drawings are incorporated herein and constitute a part of the detailed description. The detailed description includes specific details for the purpose of providing a thorough understanding of the subject technology. However, it will be clear and apparent to those skilled in the art that the subject technology is not limited to the specific details set forth herein and may be practiced without these specific details. In some instances, well-known structures and components are shown in block diagram form in order to avoid obscuring the concepts of the subject technology.

Transit planning systems have been developed in order to provide users with directions to travel between a starting location and a destination using various forms of public transportation. In such systems, a query including a starting location and a destination is received, and step by step directions are provided to reach the destination using one or more forms of public transportation. The query also includes an arrival or departure time. For example, the directions can include a sequence of which public transit vehicles (e.g., buses, trains, etc.) are used and which stops at public transit locations need to be made in order to reach the destination of the trip. The directions may include a transfer to another transit vehicle required at the different transit locations along the trip. Additionally, the directions can include a location to the first transit station and from the last transit station to the destination (e.g., a destination station or address). The transit planning system processes the transit information to determine optimal transfer patterns that describe transit routes between any two transit stations. The transfer patterns describe where transit vehicle transfers are made along each journey.

A public transit planning system therefore can provide optimal public transit routes for a given trip. The optimal public transit routes describe the best routes for a trip relative to time and other factors using only public transportation and/or walking to reach a destination from a given starting point. For a given starting point and destination point, a query graph is built from transfer patterns. In some configurations, all transfer patterns can be computed beforehand. For instance, prior to query time, the transit travel planning system processes the transit information to determine one or more transfer patterns that describe routes between any two transit stations. The transfer patterns describe where transit vehicle transfers are made along each journey. The query graph can be understood as a graph of transit stations. The query graph is connected by transit or walking arcs, and contains the best or optimal trip at any given departure time (but is much smaller than the whole transit network). The query graph in some configurations is used to determine the optimal route from the starting point to the destination point.

However, in some instances of routing for public transit, it is desired that more than the "best" routes (e.g., according to a predetermined ranking) are provided for a given trip. The subject technology provides "diversity" in a set of routes to give the user more choices (e.g., because of the user's personal tastes, or because the user may know more information on fares, etc.). In particular, the subject technology is directed to a search algorithm for providing diversity in routes by providing different trips that use different sets of lines to reach a destination point from a given starting point.

For a given station, a label can be understood as an arrival (e.g., if a search is based on chronological order) or a departure (e.g., based on a search in a reverse chronological order) at the given station. For each label, a duration and a penalty are associated. At each station, the search algorithm of the subject technology maintains a set of labels. The subject technology allows adding a new label to the set of labels if the new label is not dominated by any other label in the set according to a domination relation. However, it is possible that one or more labels in the set are dominated by the new label.

Initially each set of labels is empty for all stations, except for an initial departure station (e.g., "source station") which contains a label with a cost duration=0 and penalty=0. Adding a label to the set of labels is called "settling" a label. The search algorithm, however, is not based on a classic Dijkstra algorithm in which for a given source vertex (node) in the graph, the algorithm finds the path with lowest cost (i.e. the shortest path) between that vertex and every other vertex. In contrast, the search algorithm is based on a queue order function that only adds a label to a label set using a specified queue order. As a result, the search algorithm provides a different queue order than a domination relation.

After a query graph is generated as described above, the subject technology implements a search algorithm on the query graph to provide diversity in the selected route(s). The search algorithm takes two parameters: 1) queue order: an order in which the labels are taken into account, and 2) domination relation: a relation that decides if one label is better than another label at a given station. The queue order is utilized by a queue order function to determine the order in which labels are to be included in a set of labels at a given station, and a domination function utilizes the domination relation to determine whether one label is better than another label (i.e., the worse label is marked as "dominated" by the domination function).

In some configurations, the aforementioned queue order function can determine the queue order based on duration only, duration+penalty or some other specified cost function. Additionally, A* penalty function can also be used to adjust the queue order. The queue order function determines the first result that will be returned (e.g., duration+penalty will make the first result be the one with the best duration+penalty). A domination function then provides the diversity in routes according to the domination relation. Moreover, it is required that the domination function never dominates a label that has a better duration (e.g., in terms of total travel time) than all the labels already present at a station (e.g., in the set of labels for that station). Consequently, if the label that has the better duration is never dominated, the first result will always be determined based on the queue order from of the queue order function.

The search algorithm maintains a queue of potentially forthcoming labels. The search algorithm takes the best label according to the queue order from the queue order function, and then removes it from the queue. If the station of this label has already been "settled" by a better label according to the domination function, the label is discarded. Otherwise, the label is "settled" by the search algorithm, and is added to a queue of all labels that are reachable from this label. The reachable labels can be understood as all the ways to reach different stations from this station by using a single vehicle (e.g., the first departing vehicle of each lines) or by short distance walking.

The search algorithm continues until the label for an arrival station (e.g., "target station") is settled. In some configurations, the search algorithm implements forward and backward searches. During the forward search, instead of keeping a label only if the label is not dominated by any other settled label(s) at a respective station, the search algorithm keeps labels that do not have the best duration so long as the number of labels at this station is less than N. N in one example represents an integer parameter in order to provide up to N*N routes between the departure and arrival stations. However, multiple labels with the same duration are not kept for the forward search. The forward search is stopped when the arrival station has been settled by N labels.

The search algorithm then performs the backward search from each of these up to N arrival labels. In the backward search, the search algorithm also keeps labels that may be dominated by other labels so long as the number of settled labels at a given station is less than N. To optimize travel time, the backward search is performed starting from an arrival time determined from the forward search. The backward search uses a reverse graph and attempts to optimize departure time (e.g., to depart at late as possible). Moreover, the backward search is limited so that the departure times are not earlier than the departure times of the forward search. The results of the backward search yields to a diverse set of trips, which are filtered afterwards (e.g., removing trips that are too similar or trips that include unnecessary loops).

To determine the results to keep for each label, a set of lines are kept that have been used from the departing station to the label. In particular, at a given station, a label is not settled if the label has worse duration than another settled label and:
1. The label uses the same set of lines as another settled label (because the label does not provide more diversity).
2. The label uses the same set of lines+one other line as another settled label (because if it is faster to stay in the same vehicle, it does not make sense to propose to change the vehicle).

In some configurations, the set of lines can be determined by a hash of the used lines instead of the full set of lines. The hashing needs to be such that it allows adding a line and removing a line (e.g., by an XOR function of the IDs of the lines).

Figure 1:
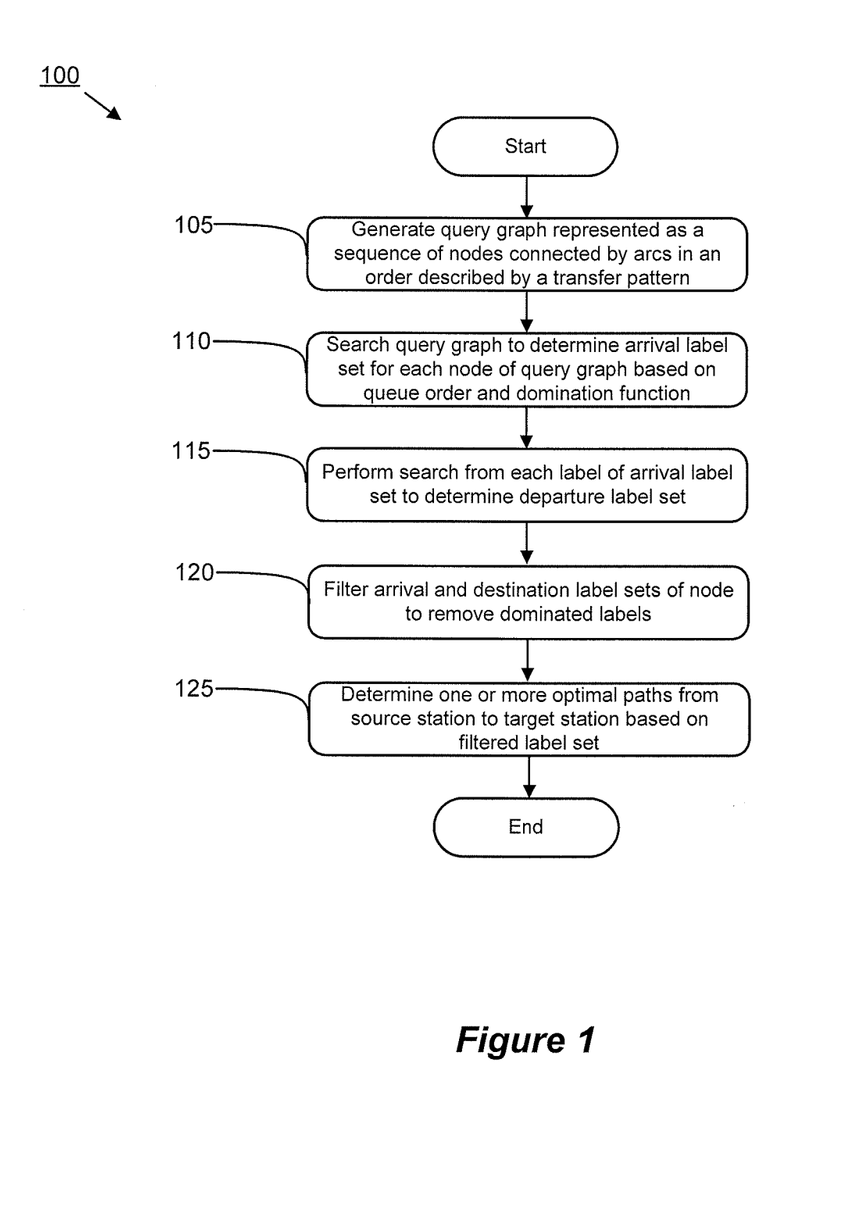
FIG. 1 conceptually illustrates an example process for providing diversity in transit routes between one or more source stations and one or more target stations.

FIG. 1 conceptually illustrates an example process 100 for providing diversity in transit routes between one or more source stations and one or more target stations. More specifically, the process 100 provides a diverse set of one or more transits routes in which optimal routes from one or more source stations to one or more target stations are included.

The process 100 starts at 105 by generating a query graph represented as a set of nodes connected by arcs in an order described by a transfer pattern. Each node of the query graph represents a respective transit station and the transfer pattern describes a transit route of one or more transfers at respective transit stations between a source station and a target station. In one example, a transfer pattern describes a sequence of transit vehicle transfers at one or more transit stations that need to be made in order reach a destination (e.g., the target station). More specifically, a transfer pattern is a sequence of one or more transfers along a public transit route at public transit stations (herein referred to as "stations") where a passenger or traveler leaves (e.g., alights) a public transportation vehicle and boards (e.g., transfers to) another public transportation vehicle. A public transportation vehicle can include, but is not limited to, buses, trains, trolleybuses, trams, etc.

In some configurations, a query graph includes transit information and is generated by the process 100 to determine the optimal route (e.g., based on different criteria) from the source station to the target station. For instance, a user can submit a query to determine a transit route starting from the source station to the target station. The query graph generated by the process 100 includes the source location and the target location related to the query, nodes representing stations, and arcs connecting the stations. The stations in the query graph represent transit stations that are included in a path(s) to reach the target station from the source station where transit vehicle transfers occur. Each arc in the query graph represents a direct connection between the pair of stations connecting the nodes. An arc therefore can represent one or more intermediate stations where stops (but no transfers) are made along a path to reach the target station connected by the arc. Further, an arc can represent walking from a station where a vehicle is departed to a station where a vehicle is boarded. Therefore, each arc between two respective nodes represents walking or a transit transfer between two transit stations respectively corresponding to the two respective nodes.

The process 100 at 110 then searches the query graph to determine an arrival label set for one or more nodes of the query graph based on a queue order and a domination function. The search at 110 can be understood as a "forward" search of the query graph. In one example, the arrival label set includes a first set of labels of a predetermined number N. N is a non-zero integer (e.g., 1, 2, 3, etc.) in some implementations. The queue order of some configurations is specified by a first function based on a duration time of each label or by a second function based on a duration time and a penalty of each label. The duration time is based on a departure time of a source node in the query graph and an arrival time at a target node in the query graph (e.g., the difference in time between the source and target nodes). In some configurations, the penalty is based on a monetary cost, a number of transfers, or a walking cost. The penalty can be a non-negative value or number and represents a cost associated with an arc connecting a source node to a target node (e.g., indicating traveling from the source to target node). The domination function utilized by the process 100 does not dominate a label that has a better duration time than another settled label (e.g., a label already included in the arrival label set).

The process 100 in some configurations maintains a queue of labels for each node in the query graph in which each label has an associated duration and/or penalty. For each node in the query graph, the process 100 selects a label from the queue of labels according the aforementioned queue order. In one example, the process 100 determines whether the selected label is dominated by another label in the arrival label set according to the aforementioned domination function and, if so, the selected label is then discarded. If the selected label is not dominated, the process 100 settles the selected label by including it in the first set of labels of the arrival label set for the node representing the transit station. Alternatively or conjunctively, instead of keeping the selected label only if the selected label is not dominated by any other label(s) of the arrival label set, the process 100 can include the selected label that does not have, for example, the best duration so long as the number of labels in the arrival label set is less than the predetermined number N. However, the process 100 at 110 does not include multiple labels with the same duration. Moreover, the process 100 continues the search at 110 until the arrival label set includes N number of labels.

For the one or more nodes of the query graph, the process 100 can perform a "backward" search from each label of the arrival label set. The process 100 can perform the backward search in order to optimize travel time by optimizing the departure time (e.g., to depart as late as possible) at each node of the query graph. For instance, the forward search performed at 110 optimizes an arrival time at each node but does not optimize travel time due to the time-dependent nature of the query graph.

To optimize travel time, the process 100 utilizes a reverse graph of the query graph in order to perform aforementioned backward search of the query graph. In some configurations, the results of the backward search can yield a second set of labels of the predetermined number N mentioned above. Additionally, the process 100 limits the backward search of the query graph by not allowing a departure time of a label from the backward search to be earlier than a departure time of the label in the arrival label set. By way of example, if the optimal trip is to first take a frequent subway, then take a train that runs every two hours, the process 100 will determine the optimal trip is to take a last subway that allows the user to catch the earliest train possible.

In some configurations, during the backward search, the process 100 can selects a label based on the aforementioned queue order that is not dominated by another label in the departure label set (e.g., according to the aforementioned domination function). Alternatively or conjunctively, the process 100 can (instead of including the selected label only if the selected label is not dominated by any other label) include the selected label that does not have, for example, the best duration so long as the number of labels is less than the predetermined number N.

The process 100 then continues to 115, for the one or more nodes of the query graph, filters the arrival label set of the one or more nodes to remove dominated labels. In one example, a first label dominates a second label responsive to a duration time (e.g., the first label's duration time is less than the second label's duration time). Another example of filtering the arrival and destination label sets is described in further detail in connection with FIG. 2 below.

The process 100 then determines one or more optimal paths at 120 from one of the source stations to one of the target stations based on the filtered label set. Each optimal path includes a set of lines between the source station and the target station, which forms a transfer pattern for a trip or journey between the source and target stations. In the context of a transfer pattern, each line can be represented by an arc or directed edge that connects a source node to a destination node forming a path between a node representing the source station and a node representing the destination station. The process 100 then ends.

Based on the determined optimal paths at 120, the subject technology can then present the one or more optimal paths to the user for the initial query for transit routes between the source station to the target station. For instance, the subject technology can provide a graphical user interface to present the one or more optimal paths (e.g., as one or more routes illustrated as a respective path(s) on a map). Additionally, the subject technology can provide directions based on the optimal paths.

Further, one or more templates of text and/or audible segments can be selected and populated so that natural language descriptions of a path can be viewed and/or heard. In one example, the path can be illustrated on a map by cross-referencing the nodes or arcs with map coordinates and tracing one or more lines, adding icons/text, etc.

Figure 2:
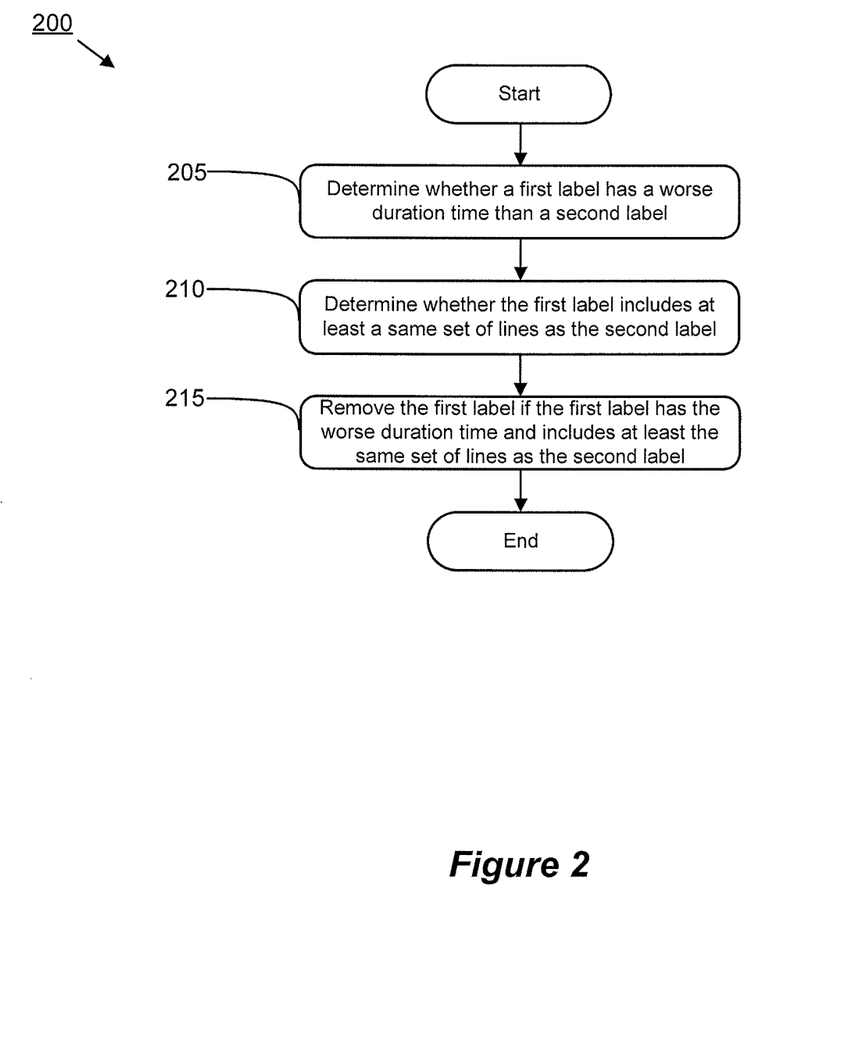
FIG. 2 conceptually illustrates an example process for filtering arrival label set of a node(s) to remove dominated labels.

FIG. 2 conceptually illustrates an example process 200 for filtering arrival label set of a node(s) to remove dominated labels. In particular, the process 200 can be performed conjunctively with the process 100 in FIG. 1 described above. For each label at a node of the query graph, the subject technology includes a set of lines that forms a path from a source station (e.g., the departing station) to the station (e.g., node) associated with the label. The process 200 can perform the operations described in further detail below to prune or filter a label at a node according to one or more different criteria.

The process 200 begins at 205 by determining whether a first label has a worse duration time than a second label at a given node of the query graph. By way of example, the process 200 can determine that the first label has a worse duration time if a duration time associated with the first label is a greater time period than the duration time associated with the second label. The process 200 continues to 210 to determine whether the first label includes at least a same set of lines as the second label (and therefore does not provide additional diversity). The process 200 at 215 then removes the first label if the first label has the worse duration time and includes at least the same set of lines as the second label. In this manner, a particular label is not settled in the arrival or departure label sets if the above criteria is met. The process 200 then ends.

In some configurations, the set of lines for a path is determined by a hash of used lines instead of a full set of lines. The hash of used lines in some implements can be an XOR function (e.g., "exclusive or" or "exclusive disjunction"). Each line in the set of lines includes a respective identifier that can be hashed to generate, for example, a numerical identifier. By hashing the set of used lines, a comparison between respective sets of lines is more efficient (e.g., from a memory storage context) to determine whether the aforementioned first and second labels utilize the same sets of lines.

As mentioned above, the process 200 of FIG. 2 can be performed conjunctively with the process 100 described above in FIG. 1. More specifically, the subject technology can perform the operations in the process 200 to prune labels from the arrival label set (e.g., at 115 in FIG. 1) in order to filter a label(s) that is not considered diverse in the context of the subject technology.

Figure 3:
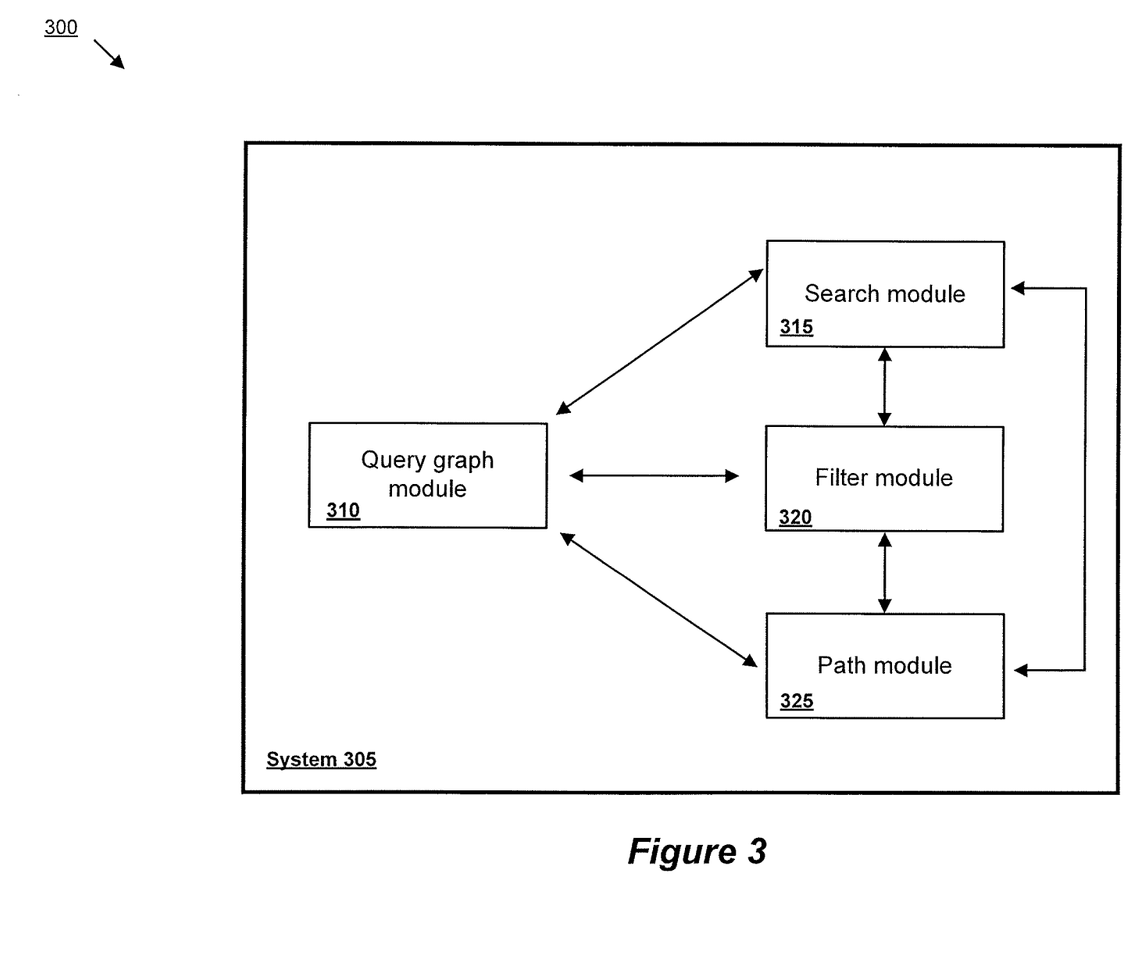
FIG. 3 conceptually illustrates an example computing environment.

FIG. 3 conceptually illustrates an example computing environment 300 including a system for providing diversity in transit routes between one or more source stations and one or more target stations. In particular, FIG. 3 shows a system 305 for implementing the above described processes FIGS. 1 and 2. In some configurations, the system 305 is part of an implementation running a particular machine (e.g., a server-based implementation).

As shown in FIG. 3, the system 305 includes several modules for providing different functionality. The system 305 is configured to include a query graph module 310, a search module 315, a filter module 320, and a path module 325. The query graph module 310 is configured to generate a query graph represented as a set of nodes connected by arcs in an order described by a transfer pattern. Each node represents a respective transit station and the transfer pattern describes a transit route of one or more transfers at transit stations between the source station and the target station. The search module 315 is configured to search the query graph to determine an arrival label set for one or more nodes of the query graph based on a queue order and a domination function. In one example, the arrival label set includes a first set of labels of a predetermined number N, wherein N is a non-zero integer. The search module 315 is further configured to, for the one or more nodes of the query graph, perform a backward search of each label of the arrival label set.

The filter module 320 is configured to, for the one or more nodes of the query graph, filter the arrival label set of the one or more nodes to remove dominated labels. A first label dominates a second label responsive to a duration time in one example. The path module 325 is configured to determine one or more optimal paths from one of one or more source stations to one of one or more target stations based on the filtered label set. Each optimal path includes a set of lines between the source station and the target station. Additionally, each optimal path forms a respective transfer pattern for a trip between the one of the one or more source stations and the one of the one or more target stations.

As further shown in FIG. 3, each of the aforementioned modules can be configured to communicate between each other. For instance, different data, messages, API calls and returns can be passed between the different modules in the system 305.

Many of the above-described features and applications are implemented as software processes that are specified as a set of instructions recorded on a machine readable storage medium (also referred to as computer readable medium). When these instructions are executed by one or more processing unit(s) (e.g., one or more processors, cores of processors, or other processing units), they cause the processing unit(s) to perform the actions indicated in the instructions. Examples of machine readable media include, but are not limited to, CD-ROMs, flash drives, RAM chips, hard drives, EPROMs, etc. The machine readable media does not include carrier waves and electronic signals passing wirelessly or over wired connections.

In this specification, the term "software" is meant to include firmware residing in read-only memory and/or applications stored in magnetic storage, which can be read into memory for processing by a processor. Also, in some implementations, multiple software components can be implemented as sub-parts of a larger program while remaining distinct software components. In some implementations, multiple software subject components can also be implemented as separate programs. Finally, any combination of separate programs that together implement a software component(s) described here is within the scope of the subject technology. In some implementations, the software programs, when installed to operate on one or more systems, define one or more specific machine implementations that execute and perform the operations of the software programs.

A computer program (also known as a program, software, software application, script, or code) can be written in any form of programming language, including compiled or interpreted languages, declarative or procedural languages, and it can be deployed in any form, including as a stand alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

Some configurations are implemented as software processes that include one or more application programming interfaces (APIs) in an environment with calling program code interacting with other program code being called through the one or more interfaces. Various function calls, messages or other types of invocations, which can include various kinds of parameters, can be transferred via the APIs between the calling program and the code being called. In addition, an API can provide the calling program code the ability to use data types or classes defined in the API and implemented in the called program code.

One or more APIs may be used in some configurations. An API is an interface implemented by a program code component or hardware component ("API implementing component") that allows a different program code component or hardware component ("API calling component") to access and use one or more functions, methods, procedures, data structures, classes, and/or other services provided by the API implementing component. An API can define one or more parameters that are passed between the API calling component and the API implementing component.

An API allows a developer of an API calling component (that could be a third party developer) to utilize specified features provided by an API implementing component. There may be one API calling component or there may be more than one such component. An API can be a source code interface that a computing system or program library provides to support requests for services from an application. An operating system (OS) can have multiple APIs to allow applications running on the OS to call one or more of those APIs, and a service (such as a program library) can have multiple APIs to allow an application that uses the service to call one or more of those APIs. An API can be specified in terms of a programming language that can be interpreted or compiled when an application is built.

In some configurations the API implementing component may provide more than one API, each providing a different view of or with different aspects that access different aspects of the functionality implemented by the API implementing component. For example, one API of an API implementing component can provide a first set of functions and can be exposed to third party developers, and another API of the API implementing component can be hidden (not exposed) and provide a subset of the first set of functions and also provide another set of functions, such as testing or debugging functions which are not in the first set of functions. In other configurations the API implementing component may itself call one or more other components via an underlying API and thus be both an API calling component and an API implementing component.

An API defines the language and parameters that API calling components use when accessing and using specified features of the API implementing component. For example, an API calling component accesses the specified features of the API implementing component through one or more API calls or invocations (embodied for example by function or method calls) exposed by the API and passes data and control information using parameters via the API calls or invocations. The API implementing component may return a value through the API in response to an API call from an API calling component. While the API defines the syntax and result of an API call (e.g., how to invoke the API call and what the API call does), the API may not reveal how the API call accomplishes the function specified by the API call. Various API calls are transferred via the one or more application programming interfaces between the calling (API calling component) and an API implementing component. Transferring the API calls may include issuing, initiating, invoking, calling, receiving, returning, or responding to the function calls or messages. In other words, transferring can describe actions by either of the API calling component or the API implementing component. The function calls or other invocations of the API may send or receive one or more parameters through a parameter list or other structure. A parameter can be a constant, key, data structure, object, object class, variable, data type, pointer, array, list or a pointer to a function or method or another way to reference a data or other item to be passed via the API.

Furthermore, data types or classes may be provided by the API and implemented by the API implementing component. The API calling component therefore can declare variables, use pointers to, use or instantiate constant values of such types or classes by using definitions provided in the API.

Generally, an API can be used to access a service or data provided by the API implementing component or to initiate performance of an operation or computation provided by the API implementing component. By way of example, the API implementing component and the API calling component may each be any one of an operating system, a library, a device driver, an API, an application program, or other module (it should be understood that the API implementing component and the API calling component may be the same or different type of module from each other). API implementing components may in some cases be embodied at least in part in firmware, microcode, or other hardware logic. In some configurations, an API may allow a client program to use the services provided by a Software Development Kit (SDK) library. In other configurations an application or other client program may use an API provided by an Application Framework. In these configurations the application or client program may incorporate calls to functions or methods provided by the SDK and provided by the API or use data types or objects defined in the SDK and provided by the API. An Application Framework may in these configurations provide a main event loop for a program that responds to various events defined by the Framework. The API allows the application to specify the events and the responses to the events using the Application Framework. In some implementations, an API call can report to an application the capabilities or state of a hardware device, including those related to aspects such as input capabilities and state, output capabilities and state, processing capability, power state, storage capacity and state, communications capability, etc., and the API may be implemented in part by firmware, microcode, or other low level logic that executes in part on the hardware component.

The API calling component may be a local component (i.e., on the same data processing system as the API implementing component) or a remote component (i.e., on a different data processing system from the API-implementing component) that communicates with the API-implementing component through the API over a network. It should be understood that an API implementing component may also act as an API calling component (i.e., it may make API calls to an API exposed by a different API implementing component) and an API calling component may also act as an API implementing component by implementing an API that is exposed to a different API calling component.

The API can allow multiple API calling components written in different programming languages to communicate with the API implementing component (thus the API may include features for translating calls and returns between the API implementing component and the API calling component). The API however can be implemented in terms of a specific programming language. An API calling component can, in one configuration, call APIs from different providers such as a set of APIs from an OS provider and another set of APIs from a plug-in provider and another set of APIs from another provider (e.g. the provider of a software library) or creator of the another set of APIs.

The following description describes an example API architecture in which the processes described above in FIGS. 1 and 2 and can be implemented.

Figure 4:
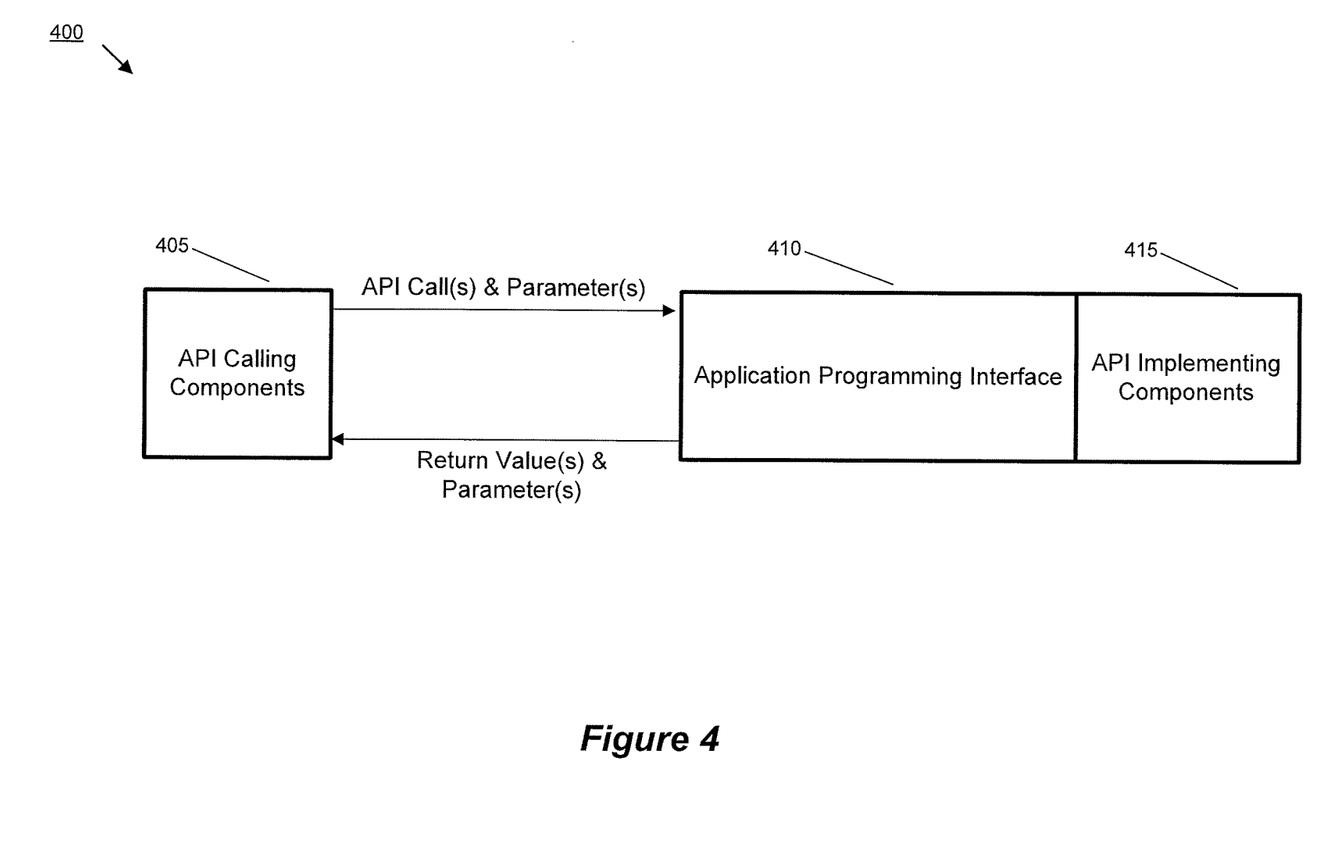
FIG. 4 conceptually illustrates an example application programming interface (API) architecture.

FIG. 4 is a block diagram illustrating an example API architecture, which can be used in some configurations of the subject technology. As shown in FIG. 4, the API architecture 400 includes the API implementing component 414 (e.g., an operating system, a library, a device driver, an API, an application program, software or other module) that implements the API 410. The API 410 specifies one or more functions, methods, classes, objects, protocols, data structures, formats and/or other features of the API-implementing component that can be used by the API-calling component 404. The API 410 can specify at least one calling convention that specifies how a function in the API implementing component receives parameters from the API calling component and how the function returns a result to the API calling component. The API calling component 404 (e.g., an operating system, a library, a device driver, an API, an application program, software or other module), makes API calls through the API 410 to access and use the features of the API implementing component 414 that are specified by the API 410. The API implementing component 414 can return a value through the API 410 to the API calling component 404 in response to an API call.

It will be appreciated that the API implementing component 414 can include additional functions, methods, classes, data structures, and/or other features that are not specified through the API 410 and are not available to the API calling component 404. It should be understood that the API calling component 404 can be on the same system as the API implementing component 414 or can be located remotely and accesses the API implementing component 414 using the API 410 over a network. While FIG. 4 illustrates a single API calling component 404 interacting with the API 410, it should be understood that other API calling components, which can be written in different languages (or the same language) than the API calling component 404, can use the API 410.

The API implementing component 414, the API 410, and the API calling component 404 can be stored in a machine-readable medium, which includes any mechanism for storing information in a form readable by a machine (e.g., a computer or other data processing system). For example, a machine-readable medium includes magnetic disks, optical disks, random access memory, read only memory, flash memory devices, etc.

The following description describes an example system in which aspects of the subject technology can be implemented.

Figure 5:
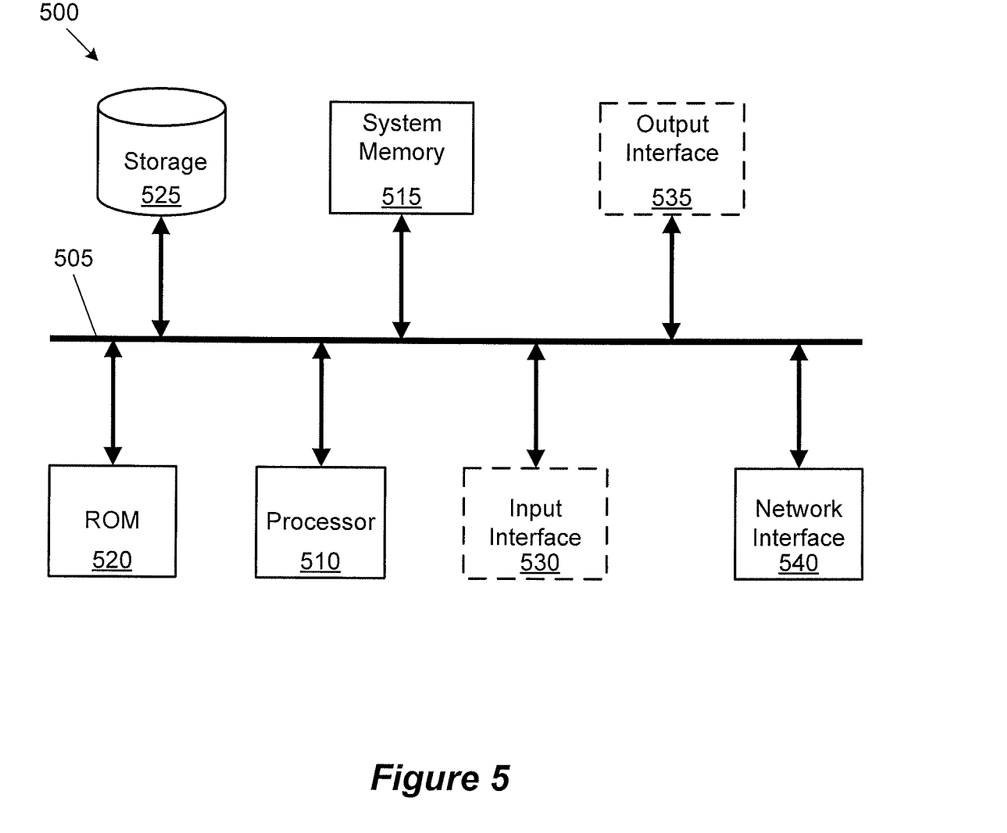
FIG. 5 conceptually illustrates a system with which some implementations of the subject technology may be implemented.

FIG. 5 conceptually illustrates a system 500 with which some implementations of the subject technology can be implemented. The system 500 can be a computer, phone, PDA, or any other sort of electronic device. Such a system includes various types of computer readable media and interfaces for various other types of computer readable media. The system 500 includes a bus 505, processing unit(s) 510, a system memory 515, a read-only memory 520, a storage device 525, an optional input interface 530, an optional output interface 535, and a network interface 540.

The bus 505 collectively represents all system, peripheral, and chipset buses that communicatively connect the numerous internal devices of the system 500. For instance, the bus 505 communicatively connects the processing unit(s) 510 with the read-only memory 520, the system memory 515, and the storage device 525.

From these various memory units, the processing unit(s) 510 retrieves instructions to execute and data to process in order to execute the processes of the subject technology. The processing unit(s) can be a single processor or a multi-core processor in different implementations.

The read-only-memory (ROM) 520 stores static data and instructions that are needed by the processing unit(s) 510 and other modules of the system 500. The storage device 525, on the other hand, is a read-and-write memory device. This device is a non-volatile memory unit that stores instructions and data even when the system 500 is off. Some implementations of the subject technology use a mass-storage device (such as a magnetic or optical disk and its corresponding disk drive) as the storage device 525.

Other implementations use a removable storage device (such as a flash drive, a floppy disk, and its corresponding disk drive) as the storage device 525. Like the storage device 525, the system memory 515 is a read-and-write memory device. However, unlike storage device 525, the system memory 515 is a volatile read-and-write memory, such a random access memory. The system memory 515 stores some of the instructions and data that the processor needs at runtime. In some implementations, the subject technology's processes are stored in the system memory 515, the storage device 525, and/or the read-only memory 520. For example, the various memory units include instructions for processing multimedia items in accordance with some implementations. From these various memory units, the processing unit(s) 510 retrieves instructions to execute and data to process in order to execute the processes of some implementations.

The bus 505 also connects to the optional input and output interfaces 530 and 535. The optional input interface 530 enables the user to communicate information and select commands to the system. The optional input interface 530 can interface with alphanumeric keyboards and pointing devices (also called "cursor control devices"). The optional output interface 535 can provide display images generated by the system 500. The optional output interface 535 can interface with printers and display devices, such as cathode ray tubes (CRT) or liquid crystal displays (LCD). Some implementations can interface with devices such as a touchscreen that functions as both input and output devices.

Finally, as shown in FIG. 5, bus 505 also couples system 500 to a network interface 540 through a network adapter (not shown). In this manner, the computer can be a part of a network of computers (such as a local area network ("LAN"), a wide area network ("WAN"), or an Intranet, or an interconnected network of networks, such as the Internet. Any or all components of system 500 can be used in conjunction with the subject technology.

These functions described above can be implemented in digital electronic circuitry, in computer software, firmware or hardware. The techniques can be implemented using one or more computer program products. Programmable processors and computers can be included in or packaged as mobile devices. The processes and logic flows can be performed by one or more programmable processors and by one or more programmable logic circuitry. General and special purpose computing devices and storage devices can be interconnected through communication networks.

Some implementations include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media can store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some implementations are performed by one or more integrated circuits, such as application specific integrated circuits (ASICs) or field programmable gate arrays (FPGAs). In some implementations, such integrated circuits execute instructions that are stored on the circuit itself.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium" and "computer readable media" are entirely restricted to tangible, physical objects that store information in a form that is readable by a computer. These terms exclude any wireless signals, wired download signals, and any other ephemeral signals.

To provide for interaction with a user, implementations of the subject matter described in this specification can be implemented on a computer having a display device, e.g., a CRT (cathode ray tube) or LCD (liquid crystal display) monitor, for displaying information to the user and a keyboard and a pointing device, e.g., a mouse or a trackball, by which the user can provide input to the computer. Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, or tactile input. In addition, a computer can interact with a user by sending documents to and receiving documents from a device that is used by the user; for example, by sending web pages to a web browser on a user's client device in response to requests received from the web browser.

Configurations of the subject matter described in this specification can be implemented in a computing system that includes a back end component, e.g., as a data server, or that includes a middleware component, e.g., an application server, or that includes a front end component, e.g., a client computer having a graphical user interface or a Web browser through which a user can interact with an implementation of the subject matter described in this specification, or any combination of one or more such back end, middleware, or front end components. The components of the system can be interconnected by any form or medium of digital data communication, e.g., a communication network. Examples of communication networks include a local area network ("LAN") and a wide area network ("WAN"), an inter-network (e.g., the Internet), and peer-to-peer networks (e.g., ad hoc peer-to-peer networks).

The computing system can include clients and servers. A client and server are generally remote from each other and typically interact through a communication network. The relationship of client and server arises by virtue of computer programs running on the respective computers and having a client-server relationship to each other. In some configurations, a server transmits data (e.g., an HTML page) to a client device (e.g., for purposes of displaying data to and receiving user input from a user interacting with the client device). Data generated at the client device (e.g., a result of the user interaction) can be received from the client device at the server.

It is understood that any specific order or hierarchy of steps in the processes disclosed is an illustration of example approaches. Based upon design preferences, it is understood that the specific order or hierarchy of steps in the processes can be rearranged, or that all illustrated steps be performed. Some of the steps can be performed simultaneously. For example, in certain circumstances, multitasking and parallel processing can be advantageous. Moreover, the separation of various system components in the configurations described above should not be understood as requiring such separation in all configurations, and it should be understood that the described program components and systems can generally be integrated together in a single software product or packaged into multiple software products.

The previous description is provided to enable any person skilled in the art to practice the various aspects described herein. Various modifications to these aspects will be readily apparent to those skilled in the art, and the generic principles defined herein can be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. Pronouns in the masculine (e.g., his) include the feminine and neuter gender (e.g., her and its) and vice versa. Headings and subheadings, if any, are used for convenience only and do not limit the subject technology.

A phrase such as an "aspect" does not imply that such aspect is essential to the subject technology or that such aspect applies to all configurations of the subject technology. A disclosure relating to an aspect can apply to all configurations, or one or more configurations. A phrase such as an aspect can refer to one or more aspects and vice versa. A phrase such as a "configuration" does not imply that such configuration is essential to the subject technology or that such configuration applies to all configurations of the subject technology. A disclosure relating to a configuration can apply to all configurations, or one or more configurations. A phrase such as a configuration can refer to one or more configurations and vice versa.

The word "example" is used herein to mean "serving as an example or illustration." Any aspect or design described herein as "example" is not necessarily to be construed as preferred or advantageous over other aspects or designs.

All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims.

What is claimed is:

1. A machine-implemented method for providing diversity in transit routes between one or more source stations and one or more target stations, the method comprising:
    generating a query graph represented as a set of nodes;
    searching the query graph to determine an arrival set for one or more nodes of the query graph based on a queue order function and a domination function, wherein the arrival set includes a first set of labels of a predetermined number N and N is a non-zero integer;
    for the one or more nodes of the query graph, filtering the arrival set of the one or more nodes to remove dominated labels; and
    determining one or more optimal paths from one of the source stations to one of the target stations based on the filtered arrival set.

2. The method of claim 1, wherein the set of nodes is connected by arcs and each node represents a respective transit station.

3. The method of claim 2, wherein each arc between two respective nodes represents walking or a transit transfer between two transit stations respectively corresponding to the two respective nodes.

4. The method of claim 1, for one or more nodes of the query graph, performing a backward search of the arrival set.

5. The method of claim 4, wherein, for a respective node of the query graph, each label from the backward search includes a departure time that is not earlier than any departure time in the arrival set for the respective node.

6. The method of claim 2, wherein the set of nodes is connected by the arcs in an order described by a transfer pattern.

7. The method of claim 6, wherein the transfer pattern describes a transit route of one or more transfers at transit stations between the one of the source stations and the one of the target stations.

8. The method of claim 1, wherein each optimal path includes a set of lines between the one of the source stations and the one of the target stations.

9. The method of claim 1, wherein a first label dominates a second label responsive to a duration time.

10. The method of claim 9, wherein the duration time is based on an arrival time at a target node and a departure time of a source node.

11. The method of claim 9, wherein the first label dominates the second label if the first label has a lower duration time than a second duration time associated with the second label.

12. The method of claim 1, wherein the domination function does not dominate a label that has a better duration time than another settled label.

13. The method of claim 1, wherein the queue order is specified by a first function based on a duration time of each label or by a second function based on a duration time and a penalty of each label, or by an A* penalty function.

14. The method of claim 13, wherein the penalty is based on a monetary cost, a number of transfers, or a walking cost.

15. The method of claim 14, wherein the penalty is a non-negative number.

16. The method of claim 1, wherein filtering the arrival label set to remove dominated labels comprises:
    determining whether a first label has a worse duration time than a second label;
    determining whether the first label includes at least a same set of lines as the second label; and
    removing the first label if the first label has the worse duration time and includes at least the same set of lines as the second label.

17. The method of claim 16, wherein the worse duration time is a greater time period than a second time period associated with a respective duration time of the second label.

18. The method of claim 1, wherein a set of lines for a respective optimal path is determined by a hash of used lines instead of a full set of lines.

19. The method of claim 18, wherein the hash of used lines comprises an XOR function.

20. The method of claim 18, wherein each line in the set of lines includes a respective identifier.

21. The method of claim 1, wherein each optimal path forms a respective transfer pattern for a trip between the one of the source stations and the one of the target stations.

22. The method of claim 21, wherein the respective transfer pattern includes one or more directed arcs between a source node and a destination node.

23. A system for providing diversity in transit routes between one or more source stations and one or more target stations, the system comprising:
    one or more processors;
    memory accessible by the one or more processors;
    one or more modules stored in the memory and configured for execution by the one or more processors, the one or more modules comprising:
        a query graph module configured to generate a query graph represented as a set of nodes;
        a search module configured to search the query graph to determine an arrival label set for one or more nodes of the query graph based on a queue order function and a domination function, wherein the arrival label set includes a first set of labels of a predetermined number N, wherein N is a non-zero integer;
        a filter module configured to, for the one or more nodes of the query graph, filter the arrival label set of the one or more nodes to remove dominated labels; and
        a path module configured to determine one or more optimal paths from one of the source stations to one of the target stations based on the filtered label set.

24. The system of claim 23, wherein the set of nodes is connected by arcs in an order described by a transfer pattern, wherein each node represents a respective transit station and the transfer pattern describes a transit route of one or more transfers at transit stations between the one of the source stations and the one of the target stations.

25. The system of claim 23, wherein first label dominates a second label responsive to a duration time.

26. The system of claim 23, wherein each optimal path includes a set of lines between the one of the source stations and the one of the target stations.

27. The system of claim 23, wherein each optimal path forms a respective transfer pattern for a trip between the one of the source stations and the one of the target stations.

28. A machine-readable, non-transitory, storage medium comprising instructions stored therein, which when executed by a machine, cause the machine to perform operations comprising:

generating a query graph represented as a set of nodes;
searching the query graph to determine an arrival label set for one or more nodes of the query graph based on a queue order function and a domination function, wherein the arrival label set includes a first set of labels of a predetermined number N, wherein N is a non-zero integer;
for the one or more nodes of the query graph:
  determining whether a first label has a greater duration time than a second label;
  determining whether the first label includes at least a same set of lines as the second label; and
  removing the first label if the first label has the greater duration time and includes at least the same set of lines as the second label; and
determining one or more optimal paths from one of one or more source stations to one of one or more target stations based on a set of labels remaining in the arrival label set.

29. The machine-readable, non-transitory, storage medium of claim 28, wherein the set of nodes are connected by arcs in an order described by a transfer pattern and each node represents a respective transit station.

30. The machine-readable, non-transitory, storage medium of claim 29, wherein the transfer pattern describes a transit route of one or more transfers at transit stations between the one of one or more source stations and the one of one or more target stations.

31. The machine-readable, non-transitory, storage medium of claim 28, wherein each optimal path includes a set of lines between the one of one or more source stations and the one of one or more target stations.

* * * * *